United States Patent [19]

Millauer

[11] 3,924,839

[45] Dec. 9, 1975

[54] CONTINUOUSLY OPERATING SCREW CONVEYOR

[75] Inventor: Christian Millauer, Stuttgart, Germany

[73] Assignee: Werner & Pfleiderer, Stuttgart, Germany

[22] Filed: Oct. 4, 1973

[21] Appl. No.: 403,468

[30] Foreign Application Priority Data

Nov. 20, 1972 Germany............................ 2256902

[52] U.S. Cl. ........................ 259/191; 259/9; 259/97

[51] Int. Cl.² ............................................ B29B 1/10

[58] Field of Search ............ 259/DIG. 1, 191, 97, 9, 259/10, 25, 26, 45, 46, 192, 193; 425/208, 209

[56] References Cited

UNITED STATES PATENTS

| | | | |
|---|---|---|---|
| 2,868,517 | 1/1959 | Lasch | 259/192 |
| 3,687,423 | 8/1972 | Koch et al. | 259/191 |

*Primary Examiner*—Harvey C. Hornsby
*Assistant Examiner*—James A. Niegowski
*Attorney, Agent, or Firm*—Woodhams, Blanchard and Flynn

[57] ABSTRACT

Material working screw. There is provided a screw for working flowable material having means therein for preventing laminar flow through the flights thereof. Transverse shearing webs extend between flights, are suitably spaced from each other and are of sufficiently less radial extent than said adjacent flights as to provide a pass-through zone between the top of each of such webs and the housing surrounding the screw. Transverse splitting webs also extend between said flights, are positioned between said shearing webs and define a slot extending in a direction having at least a radial component with respect to the axis of the screw. Thus, material passing over a shearing web cannot by laminar flow pass through the slot of such splitting web but instead the material passing through the slot of the splitting web is of a different radial orientation than that passing over the shearing web. Accordingly, laminar flow is broken up, the material further mixed and kneaded, and the desired working thereof accomplished.

15 Claims, 3 Drawing Figures

6
5
7
4
3
2
a
2
1
A

R
K
B
St
S
2
3
4
5
6
G
1
A

CONTINUOUSLY OPERATING SCREW CONVEYOR

FIELD OF THE INVENTION

This invention relates to a continuously operating screw conveyor for working flowable compositions comprising a housing enclosing the screw and transverse shearing webs disposed in the screw threads or screw channels, the height of said transverse shearing webs being smaller than that of the screw winding.

BACKGROUND OF THE INVENTION

In known machines of this type, there is a danger that material will be deposited behind the transverse webs in the direction of flow and will remain adherent thereto. The material which flows over the transverse shearing web merely slides over this deposited material portion, thereby producing insufficient mixing of the same. This danger exists particularly in cases when two or more transverse shearing webs are disposed behind one another, for pockets are formed between the transverse shearing webs which become clogged with material while the flowing composition flows over the clogged pockets in laminar fashion. Another drawback of the known screw conveyors is that the treated material can flow through the screw threads in the form of a so-called block flow, in which the outer layers are displaced relative to one another and are mixed with one another, but which still have a dead zone in the center. Under certain circumstances, this zone can traverse the entire length of the screw conveyor without being correctly mixed. Even when the material passes over the shearing webs, it is only pressed together in the inner region under certain circumstances.

The invention has as a major object the designing of a screw conveyor of the afore-cited type such that immobile blocks of material behind the transverse shearing webs can be prevented from forming either partially or completely and the internal unmixed regions are disrupted in any laminar block flow which can possibly occur.

This object is accomplished in accordance with the invention by providing in addition transverse splitting webs which substantially coincide in height with the height of the screw winding and which respectively have a shearing gap extending substantially radially to the screw axis.

In the screw conveyor according to the invention, the material is forced to pass through a shearing gap after flowing over one or more transverse shearing webs. This shearing gap intersects the passage gap above the shearing webs as seen in the direction of flow, thereby causing the material to be diverted by up to 90°, thus disrupting the laminar flow and providing for good mixing of the material behind the shearing webs. The formation of immobile islands of material behind the shearing webs is prevented in this manner as well as preventing the occurrence of laminar block flow.

According to one embodiment of this invention, a transverse splitting web can be located behind each transverse shearing in the direction of flow. This reliably prevents the formation of immobile islands of material behind each transverse shearing web. It can also be expedient, however, to position one or more transverse splitting webs behind one respective group of transverse shearing webs in the direction of flow. This also causes the laminar block flow to be sufficiently disrupted to substantially prevent the formation of immobile material blocks.

The cross-sectional area between the surface of each transverse shearing web and the inner housing wall preferably coincides substantially with the cross-sectional area of the shearing gap of the next transverse splitting web. It must be taken into account when calculating the cross-sectional areas that a pressure flow is generally prevalent in one cross section and a lag flow is generally prevalent in the other. The resultant deviations in the two cross sections, however, are not very large.

Each shearing gap preferably extends from the free outer edge of the associated transverse splitting web in the direction of the base thereof. The shearing gaps which open freely toward the outer edge of the transverse splitting webs are easy to manufacture.

It is advantageous when each shearing gap tapers towards the base of the associated transverse splitting web, thereby creating a good shearing effect in the shearing gap.

The corner angles formed between each transverse splitting web and the adjacent screw windings and lying in front in the direction of flow are rounded off or filleted up to the region of the shearing gap, thereby preventing immobile material from collecting in the corner angles.

The shearing gaps may be disposed in the center area or in one of the marginal areas of the associated transverse splitting web.

BRIEF DESCRIPTION OF THE DRAWINGS

Embodiments of the invention are illustrated in the drawing, in which.

DETAILED DESCRIPTION

Figure 3:
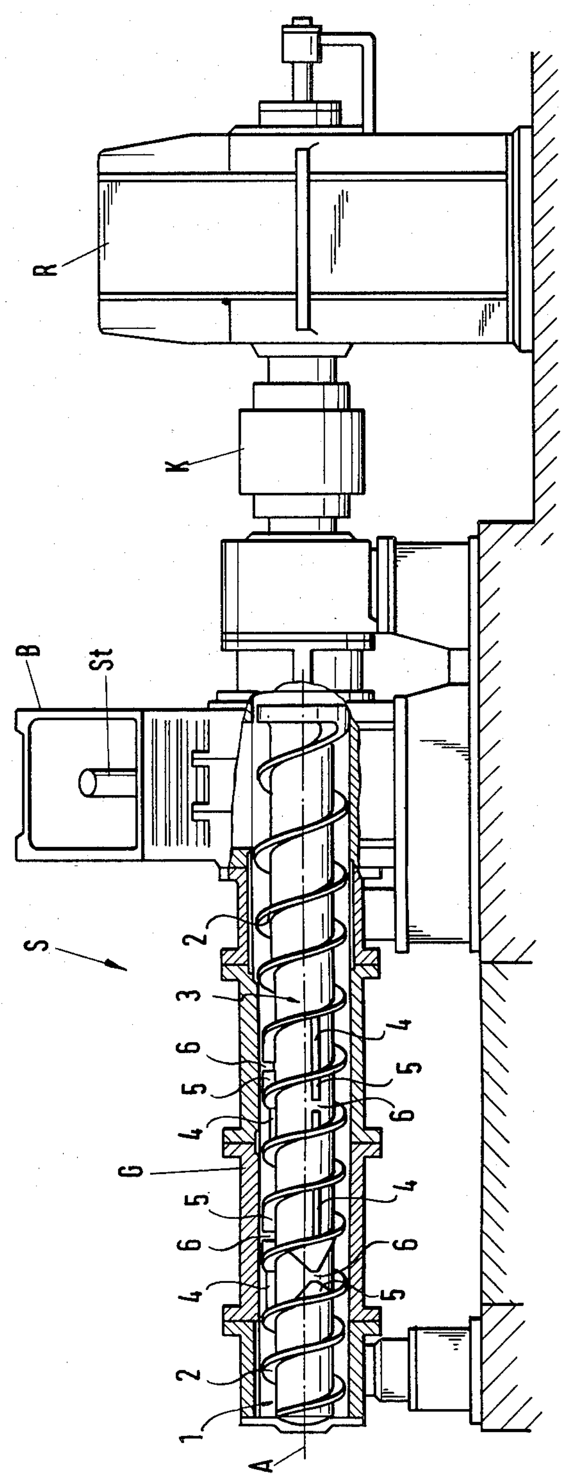
FIG. 3 is a partial central sectioned and partial elevational view of a screw conveyor according to the invention.

The screw conveyor S seen in FIG. 3 serves to work plastic or other flowable compositions, in particular by kneading, mixing or homogenizing them. The example shown in the drawing is a single shaft multiple thread screw conveyor.

The heart of the screw conveyor S is a screw 1 which can be rotated by a motor (not shown) about its central axis A by means of a reduction gear R and a coupling K.

The screw 1 conventionally has strip-like screw flights 2 which are surrounded externally by a housing G which closely conforms to the outer edges of the screw flights. The compositions to be worked are supplied to the screw 1 through a hopper B and, if desired, a tamping tool S*t*.

Figure 1:
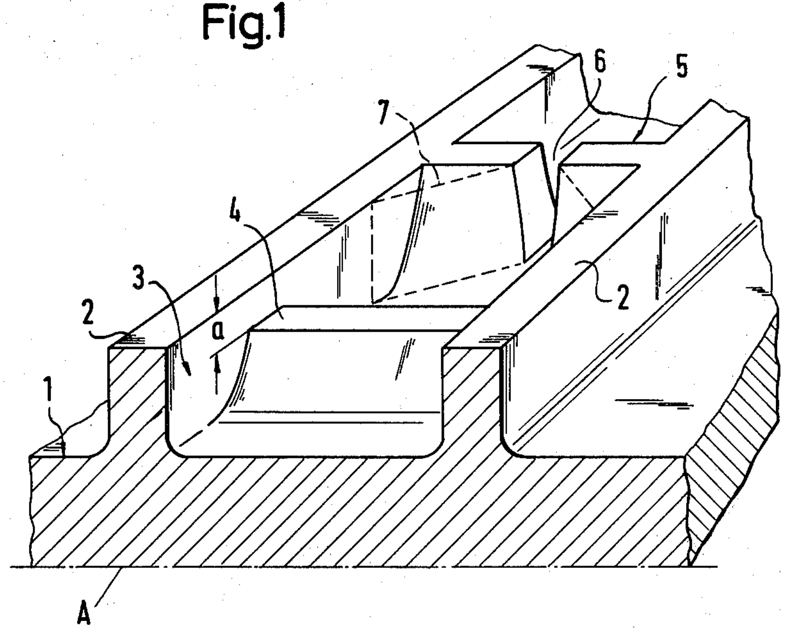
FIG. 1 is a perspective partial elevation of a screw thread of a screw conveyor according to the invention.

The screw threads or screw channels are formed between the screw flights 2, there being one screw channel illustrated at 3 in FIG. 1. Transverse shearing webs are provided in the screw channels at locations suitable for the mode of operation in a transverse position relative to the direction of material flow extending along the screw channels. Such a transverse shearing web is shown at 4, particularly in FIG. 1. It extends over the entire width of the screw channel 3 and is filleted in the manner shown at the leading edge which lies toward the front in the drawing and is rounded off toward the surface of the screw. The height of the transverse shearing web is less than the height of the adjacent screw flights 2, thereby leaving a passage gap, whose height is designated by the letter "*a*" in FIG. 1, between the outer edge of the transverse shearing web 4 and the inner side of the housing.

Figure 2:
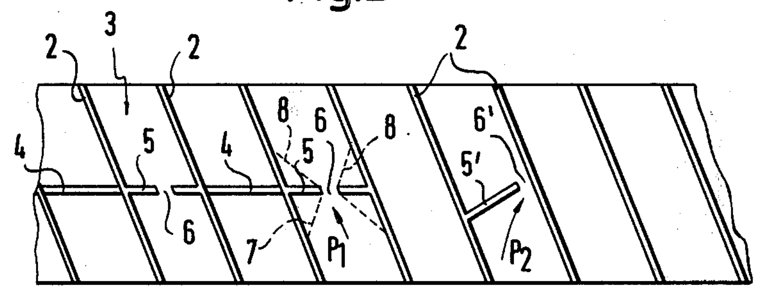
FIG. 2 is a detail of the flights of a screw conveyor according to the invention.

A transverse splitting web 5 is disposed in the screw channel 3 behind the transverse shearing web 4 in the direction of flow, extends transversely to the direction of material flow and also extends to the full height of the screw flights 2. The transverse splitting web 5 contains a splitting gap 6 which extends from the free external edge of the web facing the inner housing wall substantially radially to the screw axis A. The splitting gap extends to the base of the transverse splitting web 5 and can be tapered in the manner shown in FIG. 1 or, as indicated in FIG. 2, can have parallel boundary walls which extend radially to the screw core. The transverse splitting web can be inclined and rounded off on the leading side in the manner shown by the solid lines; however, the corner angles lying in front in the direction of flow between the transverse splitting web 5 and the screw flight 2 can be filleted as shown on the left in FIG. 2 and by the dotted lines 7 in FIG. 1. The corner angles lying in back in the direction of flow can likewise be filleted or rounded off as shown by the dotted lines at 8 in FIG. 2.

The passage cross section of the shearing gap 6 substantially corresponds to the cross section of the gap with height *a* which remains open between the outer edge of the transverse splitting web 4 and the inner wall of the housing.

The material which is being worked in the screw conveyor flows laminarly over the transverse shearing web 4 and is forced to rotate 90° due to the shearing gap 6 which intersects with the passage gap above the transverse shearing web 4 as seen in the direction of flow. This disrupts the laminar block flow and prevents a static material layer from forming behind the transverse shearing web 4.

One possible arrangement of the transverse shearing and splitting webs on a screw is shown in FIG. 2. The illustration of the screw flight shows that transverse shearing webs 4 and transverse splitting webs 5 with central shearing gaps 6 are alternately disposed respectively in the screw thread 3 between the screw flights 2. The dotted lines at 7 again show the filling out of the corner angles evident in FIG. 1 in front of the transverse splitting web as seen in the direction of flow. The material flows in the direction indicated by the arrow $P_1$. The possible filling out of the corner angles lying in back in the direction of flow is shown by the dotted lines 8.

A modified transverse splitting web 5' is indicated in the right-hand portion of FIG. 2 which extends substantially perpendicular to the screw flights 2 and in which the radial passage gap 6' is disposed on a marginal region adjacent a screw flight 2. The material here must flow into the corner angles as indicated by the arrow $P_2$. This lateral deflection of flow can produce an even stronger disruption of the laminar flow. The corner angles can be filleted or rounded off in front and in back of the transverse splitting web 5' in this case as well.

The invention is not limited to the embodiments shown. In particular, it is not necessary that the shearing gap 6 extend absolutely radial relative to the screw axis A. Shearing gaps 6 which are inclined relative to the radial also produce the desired disruption of the laminar flow as long as an angle remains between the shearing gaps 6 and the passage gap above the transverse shearing webs 4 as seen in the direction of flow. For instance, several transverse splitting webs can be arranged in series in the direction of flow, the passage gaps being increasingly rotated away from a position which deviates from the position of the passage gaps above the transverse webs only by a small angle and being increasingly rotated toward the radial. In this case, a gradual reorientation of the material flow about 90° is achieved. Another shape of the shearing gaps 6 can also be selected if this is necessitated by the material to be processed. For instance, tapering the shearing gaps 6 toward the base of the transverse splitting webs is not absolutely necessary.

On the contrary, it is probably just as well or even better in most cases to provide an embodiment in which the shearing gaps have parallel walls from the outer border of the transverse splitting web to the core diameter of the screw shaft. This embodiment is especially easy to manufacture in any case. Likewise, the shearing gaps could theoretically be closed at the upper edge of the transverse splitting webs.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privelege is claimed are defined as follows:

1. In a continuously operating screw conveyor for conveying and working flowable compositions along a flow path, comprising housing means, a screw rotatably mounted in said housing and having screw flights thereon defining a screw channel therebetween and transverse shearing webs disposed in said screw channel having a height which is smaller than the height of said screw flights to define a first shearing gap, the improvement comprising at least one transverse splitting web located in said screw channel intermediate the ends of said flow path, said splitting web having a height equal to the height of said screw flights, said splitting web having means defining a second shearing gap therein having at least a radial component relative to the axis of said screw which is different from the radial component of said first shearing gap, said splitting web and said second shearing gap turning a flat laminar flow in said screw channel generated by said first shearing gap by an angle equal to the angular spacing between said first and second shearing gaps, at least one transverse splitting web being disposed between two transverse shearing webs.

2. The improved screw conveyor according to claim 1, wherein each second shearing gap extends from the free outer edge of the associated transverse splitting web in the direction of the base thereof.

3. The improved screw conveyor according to claim 1, wherein each second shearing gap has parallel boundary walls which extend radially with respect to the axis of the screw.

4. The improved screw conveyor according to claim 1, wherein each second shearing gap tapers towards the base of the associated transverse splitting web.

5. The improved screw conveyor according to claim 1, wherein said second shearing gap is disposed in the center area of the associated transverse splitting web.

6. The improved screw conveyor according to claim 1, wherein said second shearing gap is disposed in the marginal lateral area of the associated transverse splitting web.

7. The improved screw conveyor according to claim 1, wherein a radial component for said first shearing gap is 0°.

8. The improved screw conveyor according to claim 7, wherein said radial component for said second shearing gap is 90°.

9. In a continuously operating screw conveyor for conveying and working flowable compositions along a flow path, comprising housing means, a screw rotatably mounted in said housing and having screw flights therein defining a screw channel therebetween and a plurality of transverse shearing webs disposed in said screw channel having a height which is smaller than the height of said screw flights to define a first shearing gap, the improvement comprising a plurality of transverse splitting webs located in said screw channel intermediate the ends of said flow path, said splitting webs having a height equal to the height of said screw flights, said splitting webs each having means defining a second shearing gap therein having at least a radial component relative to the axis of said screw which is different from the radial component of said first shearing gap, at least one of said splitting webs being located behind each shearing web relative to the direction of flow.

10. The improved screw conveyor according to claim 9, wherein a radial component for said first shearing gap is 0°.

11. The improved screw conveyor according to claim 10, wherein said radial component for said second shearing gap is 90°.

12. The improved screw conveyor according to claim 9, wherein a plurality of transverse splitting webs are located behind one respective group of transverse shearing webs relative to the direction of flow.

13. The improved screw conveyor according to claim 9, wherein the cross-sectional area between the surface of each transverse shearing web and an inner housing wall defining said first shearing gap substantially coincides with the cross-sectional area of the second shearing gap of the next transverse splitting web.

14. In a continuously operating screw conveyor for conveying and working flowable compositions along a flow path, comprising housing means, a screw rotatably mounted in said housing and having screw flights thereon defining a screw channel therebetween and transverse shearing webs disposed in said screw channel having a height which is smaller than the height of said screw flights to define a first shearing gap, the improvement comprising at least one transverse splitting web located in said screw channel intermediate the ends of said flow path, said splitting web having a height equal to the height of said screw flights, said splitting web having means defining a second shearing gap therein having at least a radial component relative to the axis of said screw which is different from the radial component of said first shearing gap, said splitting web and said second shearing gap turning a flat laminar flow in said screw channel generated by said first shearing gap by an angle equal to an angular spacing between said first and second shearing gaps and corner angles formed between each transverse splitting web and the adjacent screw flights lying in front in the direction of flow being rounded off or filleted up to the area of the shearing gap.

15. In a continuously operating screw conveyor for conveying and working flowable compositions along a flow path, comprising housing means, a screw rotatably mounted in said housing and having screw flights thereon defining a screw channel therebetween and transverse shearing webs disposed in said screw channel having a height which is smaller than the height of said screw flights to define a first shearing gap, the improvement comprising at least one transverse splitting web located in said screw channel intermediate the ends of said flow path, said splitting web having a height equal to the height of said screw flights, said splitting web having means defining a second shearing gap therein having at least a radial component relative to the axis of said screw which is different from the radial component of said first shearing gap, said splitting web and said second shearing gap turning a flat laminar flow in said screw channel generated by said first shearing gap by an angle equal to the angular spacing between said first and second shearing gaps and corner angles formed between each transverse splitting web and the adjacent screw flights lying in back in the direction of flow being rounded off or filleted up to the area of the shearing gap.

* * * * *